(12) United States Patent
Anderson (10) Patent No.: US 10,598,079 B2
(45) Date of Patent: Mar. 24, 2020

(54) CHARGE-FED PRE-CHAMBER ASSEMBLY

(71) Applicant: CUMMINS INC., Columbus, IN (US)

(72) Inventor: Alan C. Anderson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 13 days.

(21) Appl. No.: 15/759,345

(22) PCT Filed: Apr. 11, 2016

(86) PCT No.: PCT/US2016/026862
§ 371 (c)(1),
(2) Date: Mar. 12, 2018

(87) PCT Pub. No.: WO2017/082953
PCT Pub. Date: May 18, 2017

(65) Prior Publication Data
US 2018/0258835 A1   Sep. 13, 2018

Related U.S. Application Data (60) Provisional application No. 62/253,787, filed on Nov. 11, 2015.

(51) Int. Cl.
| | |
|---|---|
| *F02B 19/10* | (2006.01) |
| *F02B 19/12* | (2006.01) |
| *F02B 19/14* | (2006.01) |
| *F02M 21/02* | (2006.01) |
| *F02B 19/00* | (2006.01) |

(Continued)

(52) U.S. Cl.
CPC ............ *F02B 19/108* (2013.01); *F02B 19/00* (2013.01); *F02B 19/10* (2013.01); *F02B 19/12* (2013.01); *F02B 19/14* (2013.01); *F02B 23/0633* (2013.01); *F02D 9/02* (2013.01); *F02M 21/0269* (2013.01); *Y02T 10/125* (2013.01); *Y02T 10/32* (2013.01)

(58) Field of Classification Search
CPC .... F02B 19/108; F02B 23/0633; F02B 19/00; F02B 19/12; F02B 19/10; F02B 19/14; F02D 9/02; F02M 21/0269; Y02T 10/32; Y02T 10/125
See application file for complete search history.

(56) References Cited

U.S. PATENT DOCUMENTS

| | | |
|---|---|---|
| 3,989,015 A | 11/1976 | Rivere |
| 4,638,777 A | 1/1987 | Fanner et al. |
| 6,901,905 B2 | 6/2005 | Weickel et al. |

(Continued)

OTHER PUBLICATIONS

International Search Report and Written Opinion dated Jul. 5, 2016 in PCT/US2016/026862.

(Continued)

*Primary Examiner* — Joseph J Dallo
(74) *Attorney, Agent, or Firm* — Faegre Drinker Biddle & Reath LLP (57) ABSTRACT

A method for combustion in a combustion chamber of an internal combustion engine includes mixing fuel and air to form a charge, flowing a first portion of the charge to the main chamber of an engine and a second portion of the charge to the pre-chamber volume of an engine, igniting the second portion of the charge in the pre-chamber volume, and delivering the ignited second portion of the charge to the main chamber.

23 Claims, 8 Drawing Sheets

(51) Int. Cl.
    F02B 23/06    (2006.01)
    F02D 9/02     (2006.01)

(56)             References Cited

U.S. PATENT DOCUMENTS 8,925,518  B1      1/2015   Riley et al.
     9,353,674  B2 *    5/2016   Bunce ................. F02B 19/1057
     9,476,347  B2 *   10/2016   Chiera .................... F02B 19/12
     9,556,844  B2 *    1/2017   Rowan .............. F02M 61/1806
     9,653,886  B2 *    5/2017   Chiera .................... H01T 13/06
     9,765,682  B2 *    9/2017   Chiera ................. F02B 19/108
     9,797,296  B2 *   10/2017   Sasidharan ............. F02B 19/18
     9,840,963  B2 *   12/2017   Chiera .................... F02B 19/18
     9,856,848  B2 *    1/2018   Chiera ...................... F02B 9/10
     9,890,689  B2 *    2/2018   Hampson ........... F02M 21/0275
     9,893,497  B2 *    2/2018   Chiera .................... H01T 13/54
    10,202,891  B2 *    2/2019   Oda ........................ F02B 19/12
    10,208,651  B2 *    2/2019   Tozzi ...................... F02B 19/08
  2003/0111045  A1      6/2003   Bruch et al.
  2013/0000598  A1      1/2013   Tokuoka et al.
  2013/0055985  A1      3/2013   Gruber et al.
  2013/0233273  A1      9/2013   Redtenbacher et al.
  2014/0261298  A1      9/2014   Sasidharan et al.
  2016/0003117  A1 *    1/2016   Cook .................... F01N 13/107
                                                                60/321
  2017/0107938  A1 *    4/2017   Assanis .................... F02F 3/28

OTHER PUBLICATIONS

International Preliminary Report on Patentability dated Jan. 11, 2018 in PCT/US2016/026862.

* cited by examiner

CHARGE-FED PRE-CHAMBER ASSEMBLY

CROSS-REFERENCE TO RELATED APPLICATIONS

The present application is a national stage application of International (PCT) Patent Application Serial No. PCT/US2016/026862, filed on Apr. 11, 2016, which claims priority to U.S. Provisional Patent Application Ser. No. 62/253,787, filed Nov. 11, 2015, and entitled "CHARGE-FED PRE-CHAMBER ASSEMBLY," the complete disclosures of which are expressly incorporated by reference herein.

TECHNICAL FIELD OF THE DISCLOSURE

The present disclosure relates to a pre-chamber assembly of an internal combustion engine and, more particularly, to a charge-fed pre-chamber assembly.

BACKGROUND OF THE DISCLOSURE

An internal combustion engine may include both a main chamber and a pre-chamber or antechamber. The main chamber includes a piston configured to reciprocate during a combustion cycle. The pre-chamber is positioned above the main chamber and within the cylinder head of the engine. The pre-chamber may include a spark plug such that combustion may be initiated in the pre-chamber rather than the main chamber. Because there is lower turbulence of the air and/or fuel within the pre-chamber relative to the main chamber at the time of ignition, initiating combustion in the pre-chamber, rather than the main chamber, may allow for consistent initial flame kernel growth which may lead to more efficient combustion.

Various types of pre-chambers may be provided within the cylinder head, including a passive pre-chamber and a fuel-fed pre-chamber. A passive pre-chamber assembly does not directly receive any air and/or fuel, but rather, receives air and/or fuel from the main chamber during the compression stroke of the piston. However, the charge within a passive pre-chamber is leaner (i.e., includes less fuel content) than the charge in the main chamber because the charge within the passive pre-chamber assembly includes both new or fresh charge pumped into the pre-chamber assembly from the main chamber and residual charge that has remained within the main chamber after a previous combustion cycle. As such, the residual charge dilutes the new charge which decreases the fuel content present in the passive pre-chamber. The leaner charge within the passive pre-chamber assembly may require more ignition energy to combust and/or may have an elevated temperature which can increase the tendency of the charge to pre-ignite.

Additionally, a fuel-fed pre-chamber, rather than a passive pre-chamber, may be included on an engine. The fuel-fed pre-chamber directly receives raw fuel during a combustion cycle. The fuel-fed pre-chamber may require an external compressor to pump fuel to the pre-chamber. As such, additional components may be necessary to operate an engine with a fuel-fed pre-chamber, and the cost of the compressor, the associated control unit, and maintenance of the pre-chamber and its additional components may be prohibitive for certain engines or applications.

SUMMARY OF THE DISCLOSURE

In one embodiment of the present disclosure, a method for combustion in a combustion chamber of an internal combustion engine comprises mixing fuel and air to form a charge, flowing a first portion of the charge to a main chamber of the engine and a second portion of the charge to a pre-chamber volume of the engine, igniting the second portion of the charge in the pre-chamber volume, and delivering the ignited second portion of the charge to the main chamber.

In one aspect, the method further comprises supplying the second portion of the charge to the pre-chamber volume when a pressure of the pre-chamber volume is less than a pressure of the charge.

In a further aspect, the method further comprises inhibiting the flow of the second portion of the charge into the pre-chamber volume when the pressure of the pre-chamber volume is greater than the pressure of the charge.

In another aspect, the method further comprises displacing residual gases in the pre-chamber volume with the second portion of the charge.

In another aspect of the method, flowing the first portion of the charge to the main chamber and the second portion of the charge to the pre-chamber volume includes decreasing a temperature of the charge and diverting the second portion of the charge to a pre-chamber passage.

In another aspect of the method, decreasing the temperature of the charge includes flowing the charge through an aftercooler.

In a further aspect of the method, flowing the first portion of the charge to the main chamber includes decreasing a pressure of the first portion of the charge, and flowing the first portion of the charge into an intake manifold of the internal combustion engine after decreasing the pressure of the first portion of the charge.

In another aspect of the method, decreasing the pressure of the first portion of the charge includes flowing the first portion of the charge through a throttle valve.

In one aspect of the method, flowing the first portion of the charge to the main chamber and the second portion of the charge to the pre-chamber volume includes flowing 0.25-5.0% of a total volume of the charge to the pre-chamber volume and flowing 95.0-99.75% of the total volume of the charge to the main chamber.

In another embodiment of the present disclosure, an internal combustion engine comprises at least one cylinder including a main chamber and a pre-chamber fluidly coupled to the main chamber, a pre-chamber injector operably coupled to the pre-chamber, a main chamber flow passage fluidly coupled to the main chamber and configured to deliver a mixture of air and fuel to the main chamber, and a pre-chamber flow passage fluidly coupled to the main chamber flow passage and the pre-chamber. The pre-chamber flow passage is configured to deliver a portion of the mixture of air and fuel to the pre-chamber.

In one embodiment, the engine further comprises an ignition device operably coupled to the pre-chamber and configured to ignite the mixture of air and fuel in the pre-chamber.

In another embodiment of the engine, a volume of the pre-chamber is up to 5% of a clearance volume of the main chamber.

In one embodiment of the engine, the pre-chamber injector includes a check valve having an open position allowing the portion of the mixture of air and fuel to flow to the pre-chamber and a closed position inhibiting the flow of the portion of the mixture of air and fuel to the pre-chamber.

In a further embodiment of the engine, the check valve moves between the open and closed positions based on a pressure in the pre-chamber.

In a further embodiment of the present disclosure, an internal combustion engine comprises at least one cylinder having a main combustion chamber and a pre-chamber spaced apart from the main combustion chamber, an intake manifold fluidly coupled to the main combustion chamber, an inlet fluidly coupled to the intake manifold and configured to receive fuel and air to define a charge, a cooling device operably coupled to the inlet and the intake manifold, a main chamber conduit extending between the cooling device and the intake manifold and configured to provide a first portion of the charge to the main combustion chamber, and a pre-chamber conduit fluidly coupled to the main chamber conduit and extending between the main chamber conduit and the pre-chamber. The pre-chamber conduit is configured to provide a second portion of the charge to the pre-chamber.

In one embodiment of the internal combustion engine, a pressure of the first portion of the charge is less than a pressure of the second portion of the charge.

In one embodiment of the internal combustion engine, a fuel assembly is configured to supply a gaseous fuel to the main chamber and the pre-chamber conduit.

In one embodiment of the internal combustion engine, a fuel:air ratio of the first portion of the charge in the main combustion chamber is substantially identical to a fuel:air ratio of the second portion of the charge in the pre-chamber.

In one embodiment of the internal combustion engine, an amount of fuel comprising the second portion of the charge remains constant when the second portion of the charge is in the pre-chamber conduit and is in the pre-chamber.

In a further embodiment, the internal combustion engine further comprises a throttle valve operably coupled to the main chamber conduit.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 2:
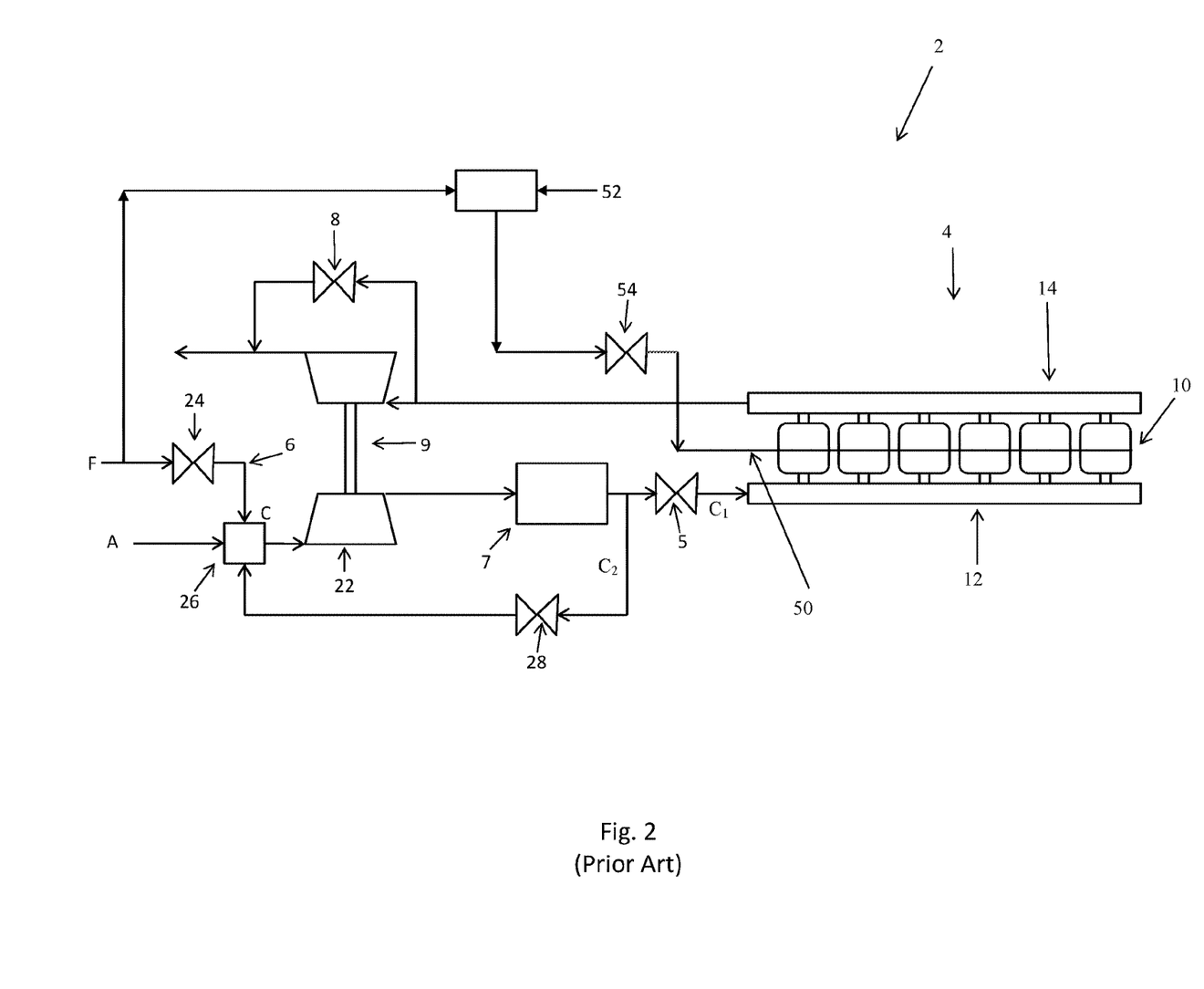
FIG. 2 is a schematic view of a prior art engine which includes a fuel-fed pre-chamber.
Figure 3A:
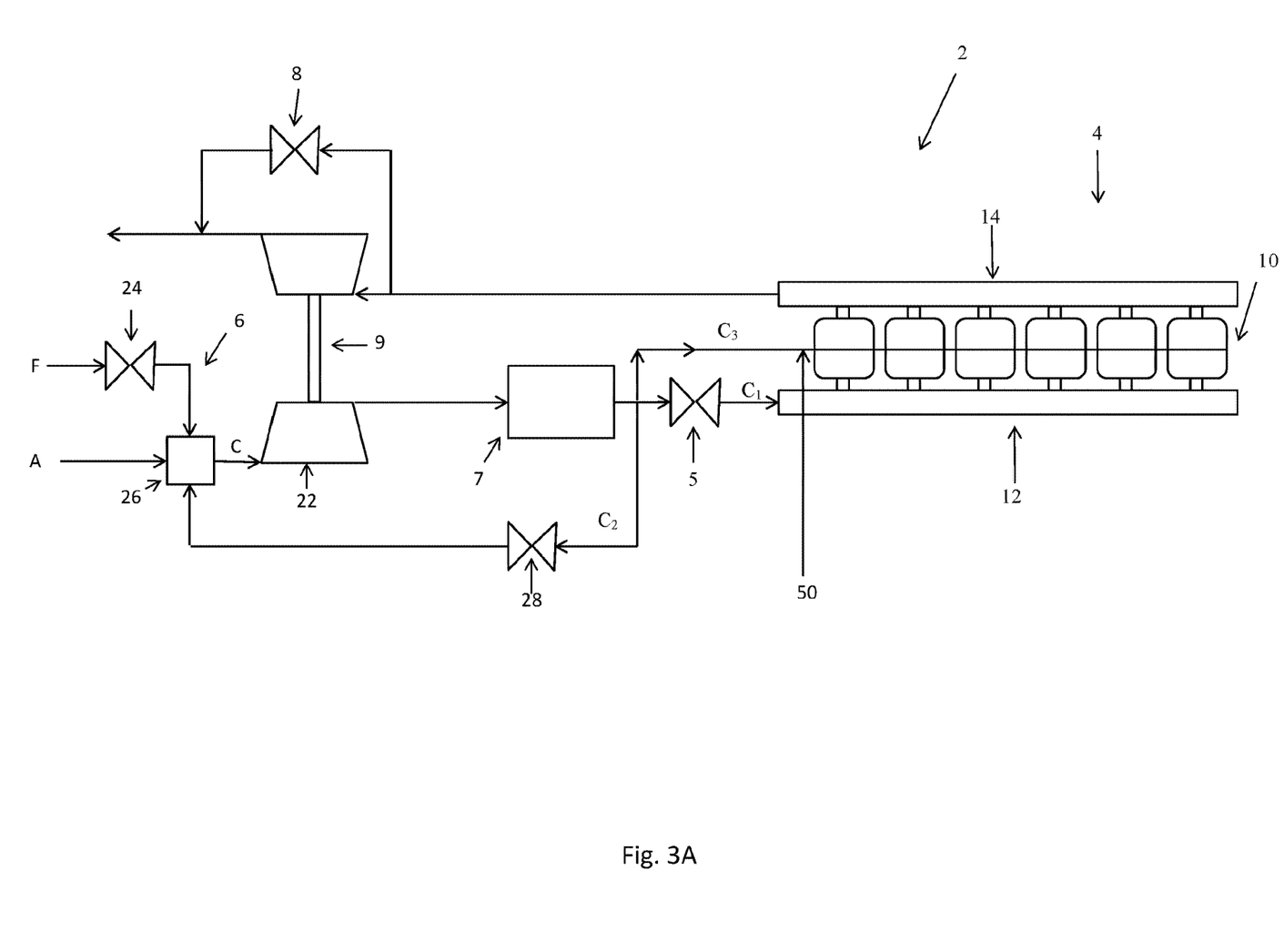
FIG. 3A is a schematic view of an engine which includes a charge-fed pre-chamber assembly of the present disclosure.
Figure 3B:
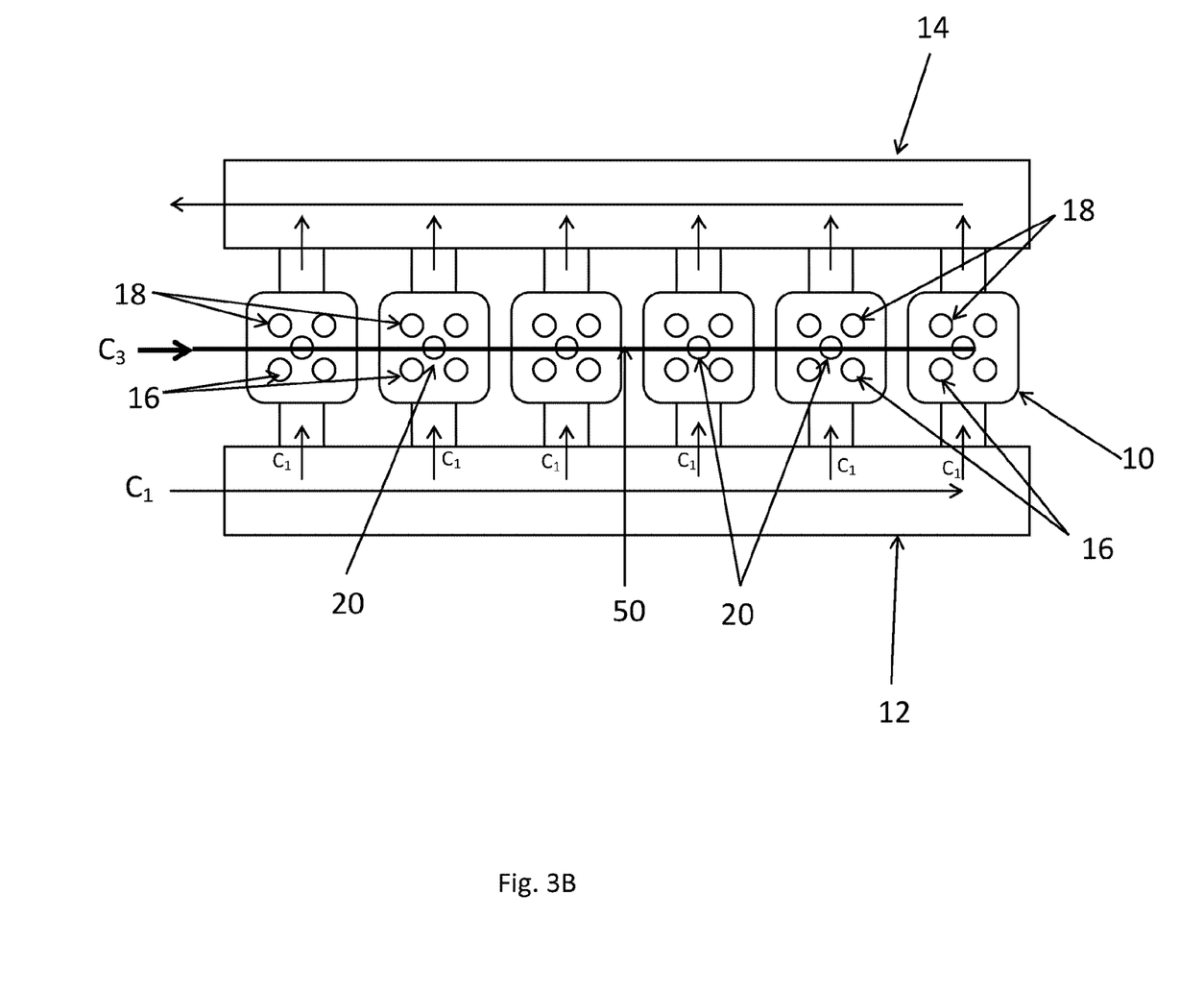
FIG. 3B is a detailed schematic view of a portion of the engine of FIG. 3A.
Figure 4:
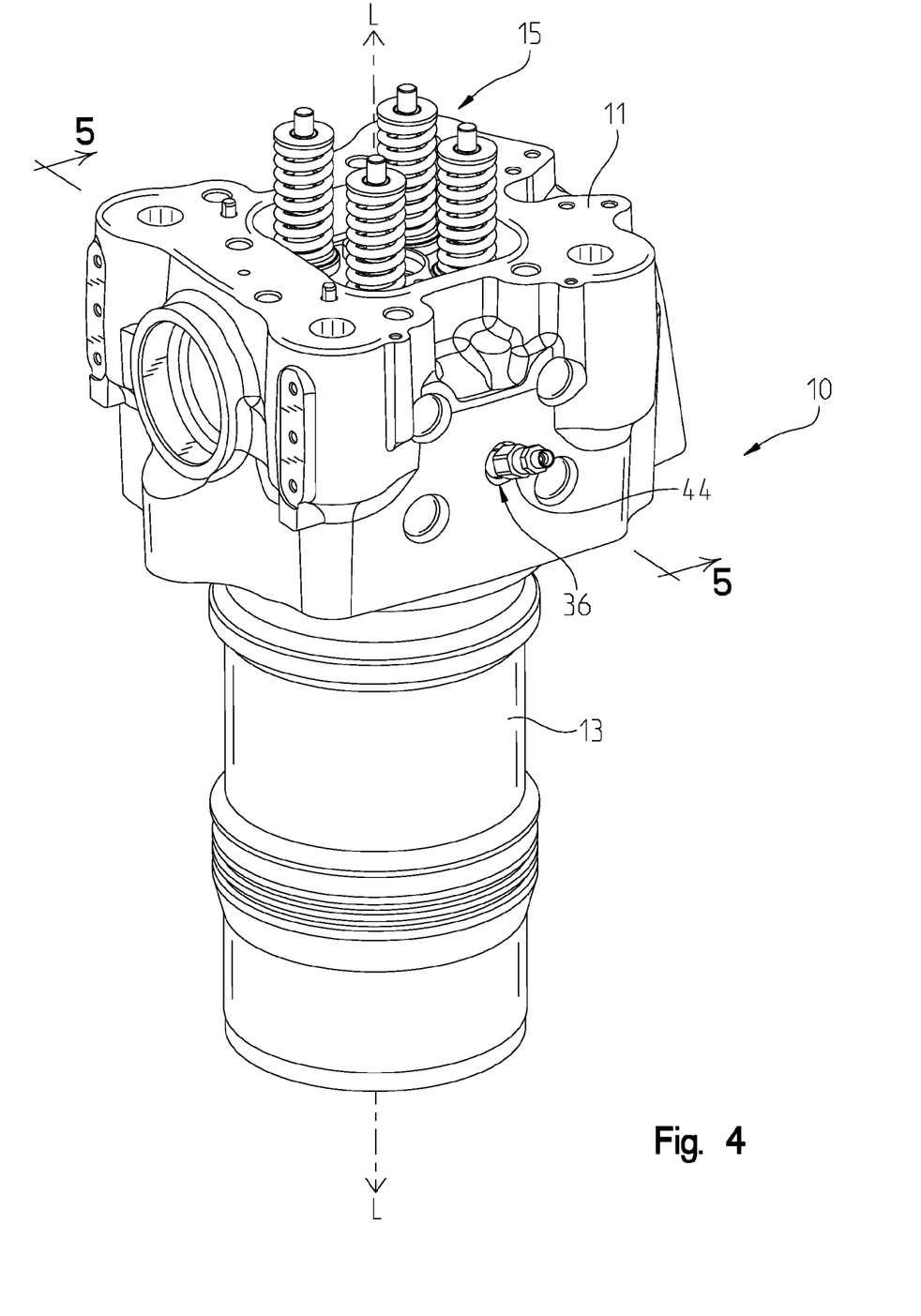
FIG. 4 is a perspective view of a portion of a cylinder of the engine of FIG. 3A with a pre-chamber conduit angled less than 90° from a longitudinal axis of the cylinder.
Figure 5:
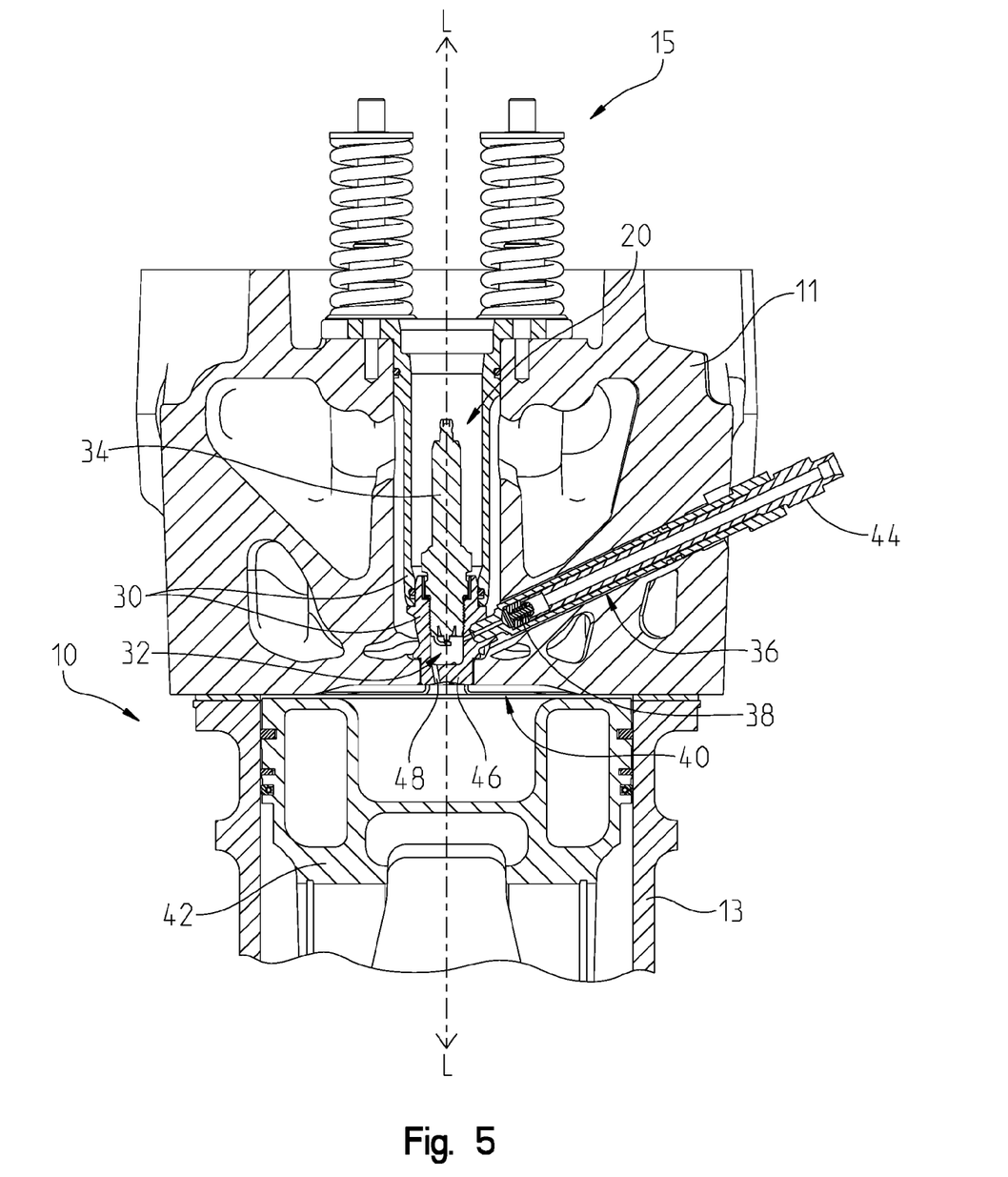
FIG. 5 is a cross-sectional view of the portion of the cylinder of FIG. 4, taken along line 5-5 of FIG. 4.

Referring to FIGS. 1-5, an engine assembly 2 includes an internal combustion engine 4, a throttle valve 5, a fuel assembly 6, an aftercooler assembly 7, a waste gate assembly 8, and a turbocharger 9. Fuel assembly 6 provides fuel to engine 4 through a fuel rail or fuel supply line 50. Engine 4 includes a plurality of cylinders 10, each having a liner 13 (FIG. 4) positioned adjacent a corresponding cylinder head 11. Cylinder 10 extends along a longitudinal axis L (FIGS. 4 and 5). A piston 42 (FIG. 5) is configured to reciprocate within liner 13 along longitudinal axis L in coordination with air and fuel flowing into and out of liner 13 (e.g., through an intake stroke, a compression stroke, a power stroke, and/or an exhaust stroke of piston 42). Cylinder head 11 is fluidly coupled to an intake manifold 12 and an exhaust manifold 14 which provide and receive air, respectively, according to the stroke of piston 42. Illustratively, engine 4 includes six cylinders 10 in an inline configuration, however, cylinders 10 may be in a V-configuration or any other type of cylinder arrangement. Additionally, engine 4 may include any number of cylinders 10.

As shown in the embodiments of FIGS. 3A-5 and 7, each cylinder 10 includes a plurality of valves 15, including at least one intake valve 16 and at least one exhaust valve 18. Additionally, each cylinder 10 includes a pre-chamber assembly 20 which is fluidly coupled to fuel assembly 6 and is positioned intermediate intake and exhaust valves 16, 18, as shown in FIG. 3B. Pre-chamber assembly 20 is fluidly coupled to supply line 50, as shown in FIGS. 3A and 3B.

Figure 1:
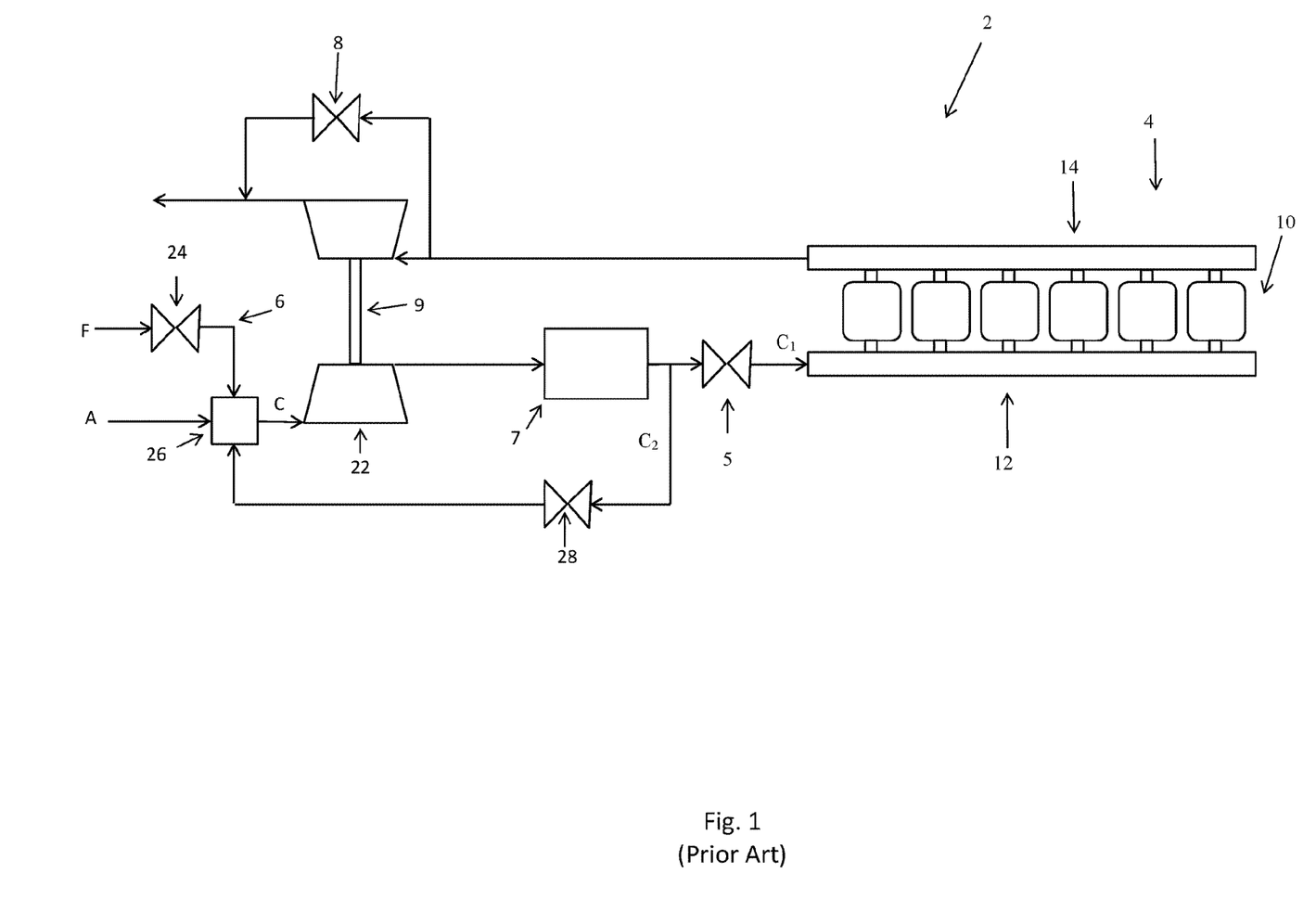
FIG. 1 is a schematic view of a prior art engine which includes a passive pre-chamber.

As shown in FIGS. 1 and 2, during operation of engine 4 with a prior art pre-chamber assembly, such as a passive (FIG. 1) or fuel-fed (FIG. 2) pre-chamber assembly, a fuel F may be provided to engine 4 upstream of a compressor 22 of turbocharger 9. Fuel F may be any gaseous fuel, for example natural gas, configured for engine 4. Fuel F may flow through a valve 24 of fuel assembly 6 to a mixing member 26 where fuel F mixes with air A to form a charge C. Charge C, comprised of fuel F and air A, then flows through compressor 22, to aftercooler assembly 7, and toward engine 4.

Referring to FIG. 1, when engine 4 includes a passive pre-chamber assembly, once charge C is downstream of aftercooler assembly 7, at least a first portion $C_1$ of charge C flows through throttle valve 5 and into intake manifold 12. Additionally, a second portion $C_2$ of charge C may bypass engine 4 and flow through a bypass valve 28 which directs second portion $C_2$ of charge C back to mixing member 26 to mix with additional quantities of fuel F and air A. In this way, all of charge C is directed to intake manifold 12 unless second portion $C_2$ of charge C bypasses intake manifold 12 through bypass valve 28. As such, the passive pre-chamber assembly 20 of engine 4 of FIG. 1 only receives charge C through intake manifold 12 because all of charge C or at least first portion $C_1$ of charge C only enters cylinders 10 through intake manifold 12.

Alternatively, and referring to FIG. 2, when engine 4 includes a fuel-fed pre-chamber, fuel F flows to engine 4 both in charge C and directly as raw fuel F. More particularly, at least a first portion $C_1$ of charge C flows through throttle valve 5 and into intake manifold 12. Additionally, a second portion $C_2$ of charge C may bypass engine 4 and flow through a bypass valve 28 which directs second portion $C_2$ of charge C back to mixing member 26 to mix with additional quantities of fuel F and air A. In this way, all of charge C is directed to intake manifold 12 unless second portion $C_2$ of charge C bypasses intake manifold 12 through bypass valve 28. However, as shown in FIG. 2, raw fuel F also flows to engine 4 because a portion of fuel F flows to a pre-chamber fuel compressor 52 where fuel F is pumped to a pre-chamber fuel control valve 54 and flows into the fuel-fed pre-chamber assemblies through fuel supply line 50. As such, charge C provides a mixture of air A and fuel F to intake manifold 12 and raw fuel F is provided to the fuel-fed pre-chamber assembly of FIG. 2 to ultimately mix with charge C for combustion in cylinders 10. By adding raw fuel F to the pre-chamber assembly of FIG. 2, the fuel quantity within cylinders 10 is increased which may enhance combustion.

According to the present disclosure and as shown in FIGS. 3A-7, instead of using a passive pre-chamber assembly (FIG. 1) or a fuel-fed pre-chamber assembly (FIG. 2), each cylinder 10 may include a charge-fed pre-chamber assembly 20 which is fluidly coupled to fuel assembly 6 and is positioned intermediate intake and exhaust valves 16, 18, as shown in FIG. 3B. Pre-chamber assembly 20 includes a pre-chamber fuel supply line 50, as shown in FIGS. 3A and 3B, to supply charge C to cylinder 10. For example, when pre-chamber assembly 20 of the present disclosure is a charge-fed pre-chamber assembly, a third portion $C_3$ of charge C is configured to flow directly into pre-chamber assembly 20 during a combustion cycle.

More particularly, and as shown in FIG. 4, charge-fed pre-chamber assembly 20 includes a pre-chamber housing 30 and an internal pre-chamber volume 32. Pre-chamber housing includes a nozzle 46 which includes at least one injection hole 48 (FIG. 5). Pre-chamber housing 30 may be configured to support an ignition source, such as a spark plug 34, longitudinally above pre-chamber volume 32. Pre-chamber volume 32 is fluidly coupled to a pre-chamber conduit 36 configured to supply third portion $C_3$ of charge C thereto. Illustratively, pre-chamber conduit 36 is operably coupled to fuel assembly 4 which includes a plurality of fuel injectors 44 and pre-chamber conduit 36 is configured to receive fuel injector 44. As shown in FIGS. 4 and 5, both pre-chamber conduit 36 and fuel injector 44 may be angled relative to pre-chamber housing 30 and/or spark plug 34. For example, as shown in FIGS. 4 and 5, pre-chamber conduit 36 may be angled less than 90° relative to longitudinal axis L. In one embodiment, pre-chamber conduit 36 is angled approximately 25-75° relative to longitudinal axis L of cylinder 10 and, more particularly, may be angled approximately 45° relative to longitudinal axis L. Pre-chamber conduit 36 may include a one-way valve 38, such as a check valve, for preventing backflow of residual gases within pre-chamber volume 32 into pre-chamber conduit 36.

Figure 6:
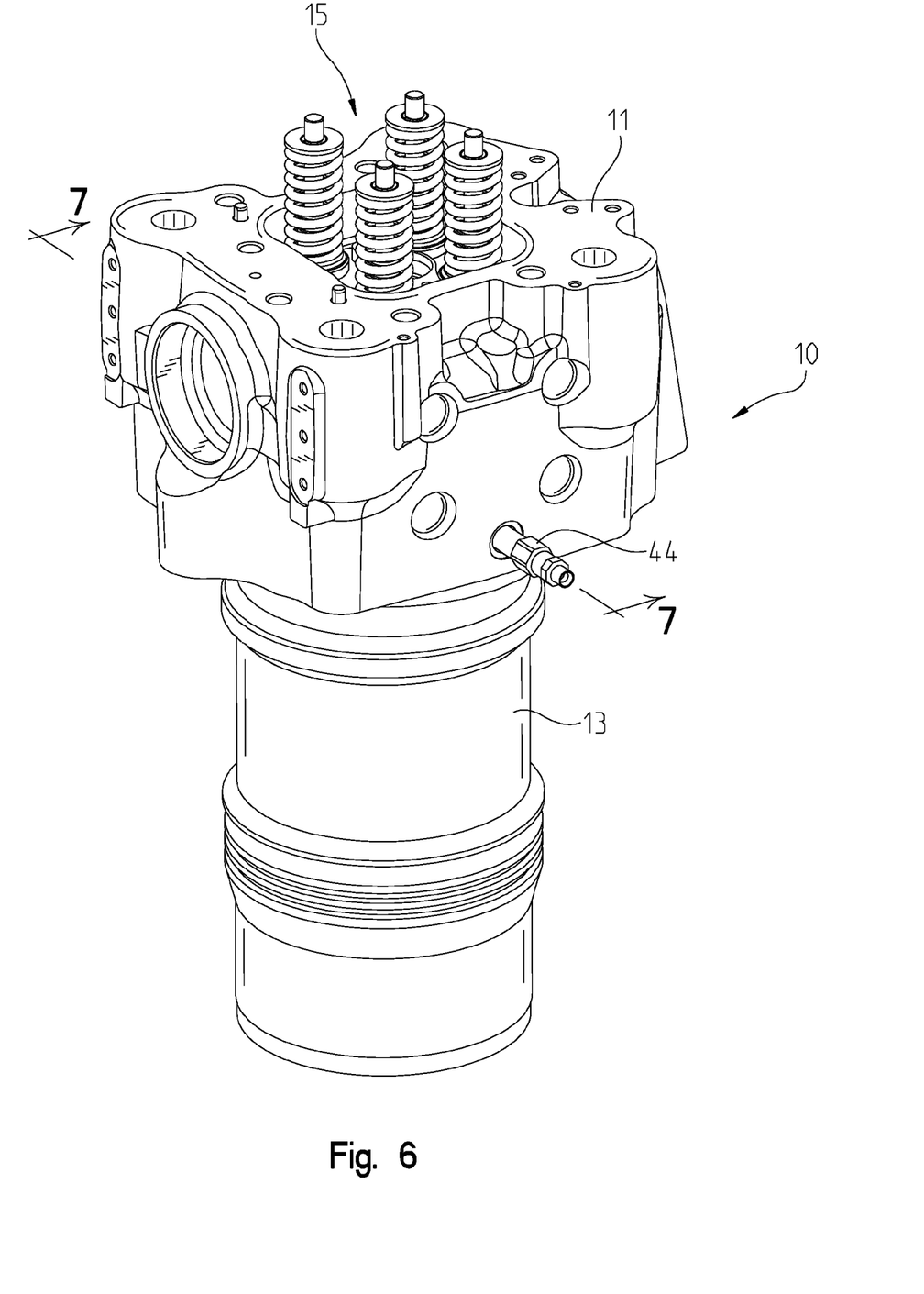
FIG. 6 is a perspective view of the portion of the cylinder of FIG. 4 with an alternative embodiment pre-chamber conduit which is angled approximately 90° from the longitudinal axis.
Figure 7:
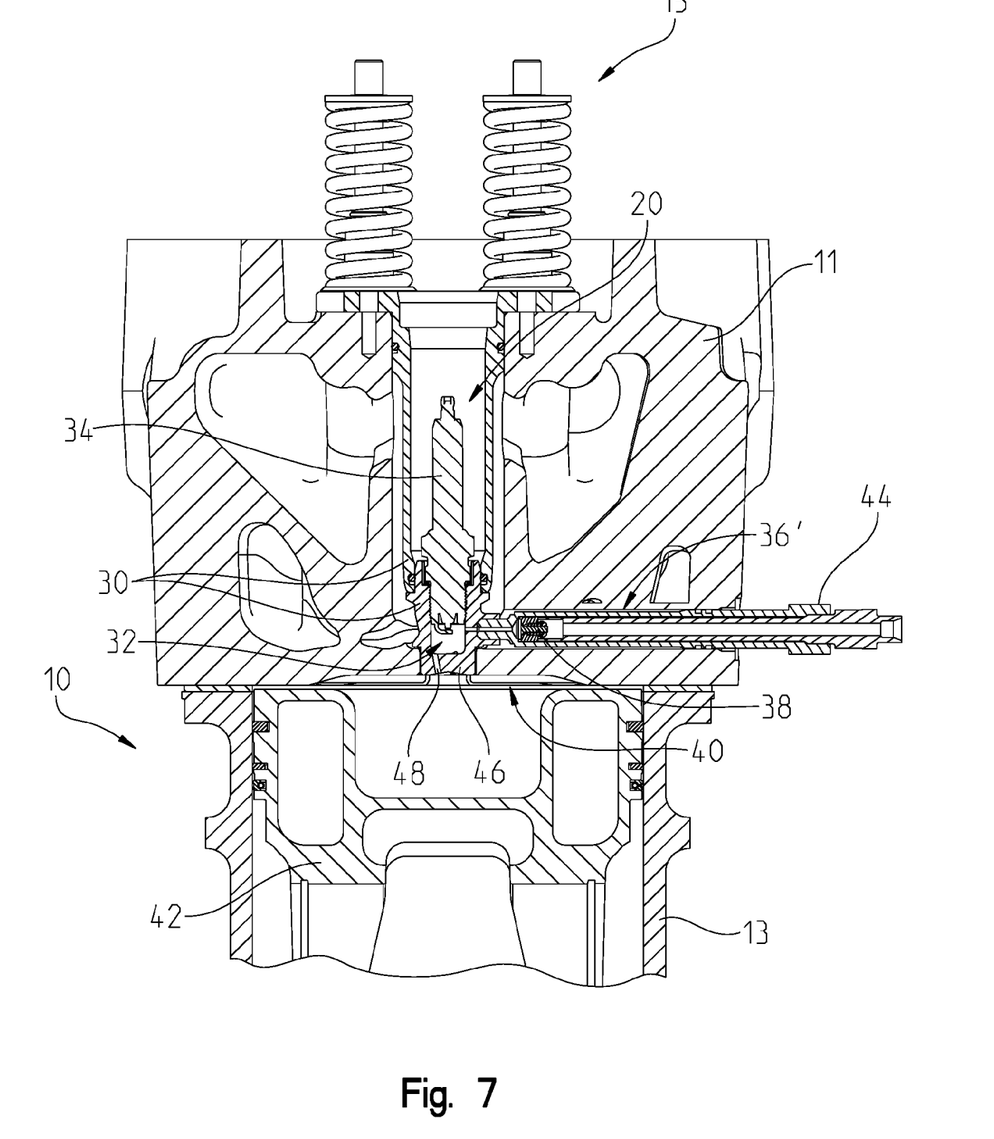
FIG. 7 is a cross-section view of the portion of the cylinder of FIG. 6, taken along line 7-7 of FIG. 6.

Referring to FIGS. 6 and 7, in an alternative embodiment, a pre-chamber conduit 36' may be angled more than 75° relative to longitudinal axis L and, more particularly, both pre-chamber conduit 36' and fuel injector 44 may be angled approximately 90° relative to longitudinal axis L such that pre-chamber conduit 36' and valve 38 are in perpendicular orientation to spark plug 34.

During operation of engine 4 and charge-fed pre-chamber assembly 20 of FIGS. 3A-7, when pressure within cylinder 10 decreases below a pre-throttle intake manifold pressure (e.g., during an exhaust stroke of piston 42 within cylinder 10), third portion $C_3$ of charge C is diverted from the charge flow between aftercooler assembly 7 and throttle valve assembly 5 towards pre-chamber assembly 20 of each cylinder 10. More particularly, when the pressure within pre-chamber volume 32 is less than the pressure of third portion $C_3$ of charge C, third portion $C_3$ of charge C flows into pre-chamber volume 32. Third portion $C_3$ of charge C then purges pre-chamber volume 32 of any residual gases from a previous combustion cycle into a main combustion chamber 40 of cylinder 10. As intake valves 16 open, first portion $C_1$ of charge C is supplied to main combustion chamber 40 and mixes with any residual gases from a previous combustion cycle, including any residual gases which were purged from pre-chamber volume 32 by third portion $C_3$ of charge C. Additionally, third portion $C_3$ of charge C continues to flow into pre-chamber volume 32 and into main combustion chamber 40 through injection holes 48 of pre-chamber nozzle 46 until the pressure within main combustion chamber 40 exceeds the pressure within pre-chamber volume 32, for example during the compression stroke. When the pressure within main combustion chamber 40 exceeds the pre-throttle intake manifold pressure and/or the pressure within pre-chamber volume 32, third portion $C_3$ of charge C stops flowing to pre-chamber volume 32. During the compression stroke, additional charge may be pumped into pre-chamber volume 32 from main combustion chamber 40. Subsequently, a spark from spark plug 34 ignites the charge within pre-chamber volume 32 to initiate combustion. Flame jets caused by the ignited charge within pre-chamber volume 32 are directed into main combustion chamber 40 through injection holes 48 of pre-chamber nozzle 46 to initiate the main chamber combustion.

In one embodiment, 0.25-5.0% of the total charge C is diverted to pre-chamber assemblies 20 as third portion $C_3$ while 95.0-99.75% of the total charge C is supplied to intake manifold 12 as first portion $C_1$. As such, the volume of pre-chamber volume 32 may be up to 5% of the clearance volume of main combustion chamber 40. Additionally, because third portion $C_3$ of charge C diverts from first portion $C_1$, third portion $C_3$ has approximately the same fuel to air ratio as first portion $C_1$.

As shown in FIG. 3A, by diverting third portion $C_3$ of charge C to pre-chamber assembly 20 downstream of aftercooler 7 and upstream of throttle valve 5, the pressure of third portion $C_3$ of charge C supplied to pre-chamber assembly 20 is greater than the pressure of first portion $C_1$ of charge C supplied to intake manifold 12 because the pressure of charge C upstream of throttle valve 5 is greater than the pressure of charge $C_1$ at intake manifold 12 (i.e., downstream from throttle valve 5). In this way, engine assembly 2 of FIGS. 3A-7 does not require an external compressor to pump third portion $C_3$ of charge C to pre-chamber assembly 20.

Also, the pressure of the incoming third portion $C_3$ of charge C displaces any residual charge or gases within pre-chamber assembly 20 from a previous combustion cycle such that third portion $C_3$ of charge C within pre-chamber assembly 20 has the desired fuel content. As such, any residual gases within pre-chamber volume 32 do not dilute the amount of fuel within third portion C3 of charge C.

Additionally, because charge C, rather than raw fuel, is supplied to pre-chamber assembly 20, fuel controls, a fuel filter, a fuel regulator, a fuel shut-off valve, a fuel vent valve, and a pressure sensor are not required for pre-chamber assembly 20.

Furthermore, because the portion of charge C diverts to pre-chamber assembly 20 downstream of aftercooler 7, the temperature of the third portion $C_3$ of charge C decreases before flowing to pre-chamber assembly 20 which decreases the likelihood that third portion $C_3$ of charge C will pre-ignite before a predetermined time during a combustion cycle.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A method for combustion in a combustion chamber of an internal combustion engine, comprising:
   mixing fuel and air to form a charge;
   flowing a first portion of the charge to a main chamber of the engine;
   bypassing the main chamber to flow a second portion of the charge to a pre-chamber volume of the engine;
   igniting the second portion of the charge in the pre-chamber volume; and
   delivering the ignited second portion of the charge to the main chamber.

2. The method of claim 1, further comprising supplying the second portion of the charge to the pre-chamber volume when a pressure of the pre-chamber volume is less than a pressure of the charge.

3. The method of claim 2, further comprising inhibiting the flow of the second portion of the charge into the pre-chamber volume when the pressure of the pre-chamber volume is greater than the pressure of the charge.

4. The method of claim 1, further comprising displacing residual gases in the pre-chamber volume with the second portion of the charge.

5. The method of claim 1, wherein flowing the first portion of the charge to the main chamber and the second portion of the charge to the pre-chamber volume includes decreasing a temperature of the charge and diverting the second portion of the charge to a pre-chamber passage.

6. The method of claim 5, wherein decreasing the temperature of the charge includes flowing the charge through an aftercooler.

7. The method of claim 1, wherein flowing the first portion of the charge to the main chamber includes decreasing a pressure of the first portion of the charge, and flowing the first portion of the charge into an intake manifold of the internal combustion engine.

8. The method of claim 7, wherein decreasing the pressure of the first portion of the charge includes flowing the first portion of the charge through a throttle valve.

9. The method of claim 1, wherein flowing the first portion of the charge to the main chamber and the second portion of the charge to the pre-chamber volume includes flowing 0.25-5.0% of a total volume of the charge to the pre-chamber volume and flowing 95.0-99.75% of the total volume of the charge to the main chamber.

10. An apparatus, comprising:
    at least one cylinder including a main chamber and a pre-chamber fluidly coupled to the main chamber; and
    a pre-chamber conduit fluidly coupled to the main chamber and the pre-chamber, the pre-chamber conduit being configured to directly deliver a portion of a mixture of air and fuel to the pre-chamber.

11. The apparatus of claim 10, further comprising an ignition device operably coupled to the pre-chamber and configured to ignite the mixture of air and fuel in the pre-chamber.

12. The apparatus of claim 10, wherein a volume of the pre-chamber is up to 5% of a clearance volume of the main chamber.

13. The apparatus of claim 10, wherein the apparatus defines an internal combustion engine.

14. An internal combustion engine, comprising:
    at least one cylinder having a main combustion chamber and a pre-chamber spaced apart from the main combustion chamber;
    an intake manifold fluidly coupled to the main combustion chamber;
    an inlet fluidly coupled to the intake manifold and configured to receive fuel and air to define a charge;
    a cooling device operably coupled to the inlet and the intake manifold;
    a main chamber conduit extending between the cooling device and the intake manifold and configured to provide a first portion of the charge to the main combustion chamber; and
    a pre-chamber conduit fluidly coupled to the main chamber conduit and extending between the main chamber conduit and the pre-chamber, the pre-chamber conduit being configured to provide a second portion of the charge to the pre-chamber.

15. The internal combustion engine of claim 14, wherein a pressure of the first portion of the charge is less than a pressure of the second portion of the charge.

16. The internal combustion engine of claim 15, further comprising a fuel assembly configured to supply a gaseous fuel to the main chamber and the pre-chamber conduit.

17. The internal combustion engine of claim 14, wherein a fuel:air ratio of the first portion of the charge in the main combustion chamber is substantially identical to a fuel:air ratio of the second portion of the charge in the pre-chamber.

18. The internal combustion engine of claim 14, wherein an amount of fuel comprising the second portion of the charge remains constant when the second portion of the charge is in the pre-chamber conduit and is in the pre-chamber.

19. The internal combustion engine of claim 14, further comprising a throttle valve operably coupled to the main chamber conduit.

20. The method of claim 1, wherein bypassing the main chamber includes directly flowing the second portion of the charge to the pre-chamber volume.

21. The method of claim 1, wherein bypassing the main chamber to flow the second portion of the charge to the pre-chamber volume occurs with or before flowing the first portion of the charge to the main chamber of the engine.

22. The apparatus of claim 10, wherein the pre-chamber conduit is configured to directly deliver the portion of the mixture of air and fuel to the pre-chamber independent of any air or fuel within the main chamber.

23. A method for combustion in a combustion chamber of an internal combustion engine, comprising:
    mixing fuel and air to form a charge;
    flowing a first portion of the charge to a main chamber of the engine;
    bypassing the main chamber to flow a second portion of the charge to a pre-chamber volume of the engine;
    igniting the second portion of the charge in the pre-chamber volume; and
    delivering the ignited second portion of the charge to the main chamber,
    wherein flowing the first portion of the charge to the main chamber and the second portion of the charge to the pre-chamber volume includes flowing 0.25-5.0% of a total volume of the charge to the pre-chamber volume and flowing 95.0-99.75% of the total volume of the charge to the main chamber.

* * * * *